United States Patent
Ramarge et al.

(10) Patent No.: US 6,483,685 B1
(45) Date of Patent: Nov. 19, 2002

(54) COMPLIANT JOINT BETWEEN ELECTRICAL COMPONENTS

(75) Inventors: Michael M. Ramarge, Olean; David P. Bailey, Portville; Thomas C. Hartman, Allegany; Roger S. Perkins, Olean, all of NY (US); Alan P. Yerges, Muskego, WI (US); Michael G. Scharrer, Franklin, WI (US); Lisa C. Sletson, Waterford, WI (US)

(73) Assignee: McGraw Edison Company, Houston, TX (US)

( * ) Notice: Subject to any disclaimer, the term of this patent is extended or adjusted under 35 U.S.C. 154(b) by 0 days.

(21) Appl. No.: 09/577,837

(22) Filed: May 25, 2000

Related U.S. Application Data

(60) Provisional application No. 60/171,605, filed on Dec. 23, 1999.

(51) Int. Cl.[7] .................................................. H02H 9/00
(52) U.S. Cl. ........................... 361/118; 361/56; 361/58; 361/117; 361/127
(58) Field of Search .............................. 361/56, 58, 117, 361/118, 119, 127, 15, 115

(56) References Cited

U.S. PATENT DOCUMENTS

| | | | |
|---|---|---|---|
| 4,404,614 A | 9/1983 | Koch et al. ................. 361/128 |
| 4,779,162 A | 10/1988 | Beitz et al. .................. 361/127 |
| 4,780,598 A | * 10/1988 | Fahey et al. ................. 361/103 |
| 5,128,824 A | 7/1992 | Yaworski et al. ............ 361/127 |
| 5,220,480 A | * 6/1993 | Kershaw, Jr. et al. ....... 361/117 |
| 5,313,184 A | * 5/1994 | Greuter et al. ................ 338/21 |
| 5,807,509 A | 9/1998 | Shrier et al. ................. 252/512 |
| 5,990,778 A | * 11/1999 | Strumpler et al. ............ 338/20 |
| 6,279,811 B1 | * 8/2001 | Ramarge ..................... 228/121 |

FOREIGN PATENT DOCUMENTS

| | | |
|---|---|---|
| EP | 0 033 420 A1 | 8/1981 |
| EP | 0 409 380 A2 | 1/1991 |
| EP | 0 410 644 A2 | 1/1991 |
| EP | 0 595 376 A2 | 5/1994 |
| EP | 0 762 439 A2 | 8/1995 |
| EP | 0 689 240 A1 | 12/1995 |
| WO | WO96/36977 | 11/1996 |
| WO | WO96/41355 | 12/1996 |

* cited by examiner

Primary Examiner—Stephen W. Jackson
(74) Attorney, Agent, or Firm—Fish & Richardson P.C.

(57) ABSTRACT

An electrically-conductive and mechanically-compliant joint is formed between a pair of electrical components. The joint is positioned between a lower face of a first electrical component and an upper face of a second electrical component. The Young's modulus of the joint is less than approximately half that of the Young's modulus of the electrical components.

69 Claims, 8 Drawing Sheets

COMPLIANT JOINT BETWEEN ELECTRICAL COMPONENTS

CROSS-REFERENCE TO RELATED APPLICATIONS

This application claims priority from U.S. Provisional Application No. 60/171,605, entitled "COMPLIANT INTERFACE," filed on Dec. 23, 1999.

TECHNICAL FIELD

The invention relates to surge arresters and other types of electrical power distribution equipment.

BACKGROUND

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment so as to shunt or divert over-voltage-induced current surges safely around the equipment, thereby protecting the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

Upon completion of the over-voltage condition, the surge arrester returns to operation in the high impedance mode. This prevents normal current at the system frequency from following the surge current to ground along the current path through the surge arrester.

Conventional surge arresters typically include an elongated outer enclosure or housing made of an electrically insulating material, a pair of electrical terminals at opposite ends of the enclosure for connecting the arrester between a line-potential conductor and electrical ground, and an array of other electrical components that form a series electrical path between the terminals. These components typically include a stack of voltage-dependent, nonlinear resistive elements, referred to as varistors. A varistor is characterized by having a relatively high resistance when exposed to a normal operating voltage, and a much lower resistance when exposed to a larger voltage, such as is associated with over-voltage conditions. In addition to varistors, a surge arrester also may include one or more spark gap assemblies housed within the insulative enclosure and electrically connected in series with the varistors. Some arresters also include electrically-conductive spacer elements coaxially aligned with the varistors and gap assemblies.

For proper arrester operation, contact must be maintained between the components of the stack. To accomplish this, it is known to apply an axial load to the elements of the stack. Good axial contact is important to ensure a relatively low contact resistance between the adjacent faces of the elements, to ensure a relatively uniform current distribution through the elements, and to provide good heat transfer between the elements and the end terminals.

One way to apply this load is to employ springs within the housing to urge the stacked elements into engagement with one another. Another way to apply the load is to wrap the stack of arrester elements with glass fibers so as to axially-compress the elements within the stack.

SUMMARY

In one general aspect, an electrically-conductive and mechanically-compliant joint is formed between a pair of electrical components. The joint is positioned between a lower face of a first electrical component and an upper face of a second electrical component. The Young's modulus of the joint is less than approximately half that of the Young's modulus of the electrical components.

Embodiments of the joint may include one or more of the following features. For example, the Young's modulus of the joint may be approximately one-eightieth to one-tenth of the Young's modulus of the electrical components. More particularly, the Young's modulus of the joint may be approximately one fortieth of the Young's modulus of the electrical components. The Young's modulus of the joint may be between approximately 200,000 psi and 1,600,000 psi and the Young's modulus of the electrical components may be between approximately 13,000,000 psi and 18,000,000 psi. More particularly, the Young's modulus of the joint may be between approximately 300,000 psi and 500,000 psi and the Young's modulus of the electrical components may be between approximately 14,000,000 psi and 17,000,000 psi. Even more particularly, the Young's modulus of the joint may be approximately 400,000 psi and the Young's modulus of the electrical components may be approximately 15,000,000 psi.

The joint creates a region between the electrical components that is mechanically more compliant than the components themselves. One reason for the greater compliance within the joint is a Young's modulus which can be less than half of that of the electrical components. The lower modulus of the joint serves to attenuate or dampen the thermo-mechanical forces generated within the electrical components during operation of, for example, a surge arrester.

The joint may further include an electrically conductive polymer that provides mechanical compliance. The joint also may further include an electrically-conductive, mechanically-compliant metal alloy.

The joint may be between approximately one-sixteenth of an inch thick and one-half of an inch thick. More particularly, the joint may be between approximately one-eighth to three-eighths of an inch thick. Even more particularly, the joint may be approximately one-fourth of an inch thick. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Electrical conductivity is provided by a first layer of an electrically-conductive adhesive adhered to the lower face of the first electrical component and a second layer of the electrically-conductive adhesive adhered to the upper face of the second electrical component. Mechanical compliance is provided by the two layers of electrically-conductive adhesive and by a polymer composite layer that is between the two layers.

Embodiments of the joint may include one or more of the following features. For example, the joint may further include a conductive shunt having a first end, a second end, and a middle section connecting the first end and the second end. The first end is positioned in the first layer of electrically-conductive adhesive, the second end is positioned in the second layer of electrically-conductive adhesive, and the middle section passes through the polymer composite layer.

The polymer composite layer may include a first surface in contact with the first layer of adhesive, a second surface in contact with the second layer of adhesive, a first opening on the first surface, a second opening on the second surface, and a channel passing between the first and second openings. The conductive adhesive of the first and second layers also is in the channel so that it provides an electrically-conductive path between the first and second layers. The polymer composite layer may further include multiple channels passing between multiple first and second openings, with the conductive adhesive in the multiple channels so that they provide electrically-conductive paths between the first and second layers. The polymer composite layer may be electrically-conductive to provide a continuous current path. The polymer composite layer also may be electrically nonconductive, in which case the conductive shunt conducts electricity between the electrical components. The joint may be incorporated in an electrical device.

In another implementation, the polymer composite layer may include an electrically-conductive material. The electrically-conductive material may include a silver alloy and/or a carbon black filler. The polymer composite layer may include an electrically-conductive composite of metal and polymer. The metal may include copper, aluminum or brass, or combinations of those metals. The polymer composite layer also may be a polymer layer having a metal coating on its surfaces. The polymer composite layer may further include electrically-conductive pins passing through the polymer layer and terminating in the adhesive layer. The opposite ends of the conductive pins may be adhered to the upper face of the second electrical component and the lower face of the first electrical component.

In another general aspect, an electrically-conductive and mechanically-compliant joint is formed between a pair of electrical components. The joint is positioned between a lower face of a first electrical component and an upper face of a second electrical component. Electrical conductivity is provided by a first region or layer of an electrically-conductive adhesive adhered to the lower face, a second region or layer of the electrically-conductive adhesive adhered to the upper face, and a metal layer disposed between the first layer and the second layer. Mechanical compliance is provided by the two layers of electrically-conductive adhesive and by the metal layer.

Embodiments of the joint may include one or more of the following features. For example, the metal layer may include a foam metal plate that may be made from aluminum or another metal. The foam metal plate may be a porous metal structure impregnated with an epoxy or an adhesive. The metal layer also may be a deformable metal plate having a first surface defining peaks and valleys and a second opposite facing surface defining peaks and valleys, and may be made from aluminum or copper, or a combination of those and/or other metals. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Electrical conductivity is provided by regions or layers of an electrically-conductive adhesive, and mechanical compliance is provided by alternating regions or layers of an electrically nonconductive adhesive. The electrical apparatus may be incorporated in an electrical device.

In another general aspect, an electrically-conductive and mechanically-compliant joint is formed between a pair of electrical components. The joint is positioned between a lower face of a first electrical component and an upper face of a second electrical component. Electrical conductivity is provided by at least one metal spring adhered on a first end to the upper face and on a second end to the lower face. Mechanical compliance is provided by the metal spring and an adhesive positioned between the upper face and the lower face.

Embodiments of the joint may include one or more of the following features. For example, the adhesive may be an electrically-conductive adhesive that provides electrical conductivity for the joint. A nonconductive adhesive also may be used instead of the electrically-conductive adhesive. The joint may further include additional metal springs adhered on each first end to the upper face of the second electrical component and on each second end to the lower face of the first electrical component. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Electrical conductivity and mechanical compliance are provided by an electrically-conductive shunt having a first end, a second end, and a middle section that connects the first and second ends, a first solder joint that electrically connects the first end to the lower face of the first electrical component, and a second solder joint that electrically connects the second end to the upper face of the second electrical component.

Embodiments of the joint may include one or more of the following features. For example, further mechanical compliance may be provided by an epoxy layer positioned between the lower face and the upper face, and surrounding the electrically-conductive shunt. The shunt may be a spring or multiple springs. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Mechanical compliance is provided by alternating regions or layers of a metal and an epoxy. Electrical compliance is provided by the regions or layers of metal. The alternating regions or layers of the metal and the epoxy are oriented perpendicularly to the upper surface and the lower surface.

Embodiments of the joint may include one or more of the following features. For example, the regions of metal may be regions or layers of a foam metal. The regions or layers of the foam metal may include a porous structure impregnated with an epoxy, an elastomer, or an adhesive, or a combination of these. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Electrical conductivity is provided by at least one metal wire adhered on a first end to the upper face of the second electrical component and on a second end to the lower face of the first electrical component. Mechanical compliance is provided by the metal wire and an adhesive layer positioned between the upper face and the lower face.

Embodiments of the joint may include one or more of the following features. For example, the metal wire may be adhered to the upper face and the lower face by solder. Additional metal wires may be adhered on each first end to the upper face and on each second end to the lower face. The metal wire may be in the form of one or more springs or one or more straps. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Mechanical compliance and electrical conductivity are provided by a first layer of solder adhered to the lower face of the first electrical component, a second layer of solder adhered to the upper face of the second electrical component, and a metal layer between the first and second layers of solder.

Embodiments of the joint may include one or more of the following features. For example, the metal layer also may be a deformable metal plate having a first surface defining peaks and valleys and a second opposite facing surface defining peaks and valleys, and may be made from aluminum or copper, or a combination of those metals. The metal layer also may be a foam metal plate, and the foam metal plate may be a porous structure impregnated with an epoxy or an adhesive. The metal layer also may be a polymer composite layer having a surface metallization of a conductive material. The polymer composite may include a carbon black or a silver alloy filler. The joint may be incorporated in an electrical device.

In another general aspect, an electrically-conductive and mechanically-compliant joint is formed between a pair of electrical components. The joint is positioned between a lower face of a first electrical component and an upper face of a second electrical component. Mechanical compliance and electrical conductivity are provided by an electrically-conductive adherent layer and a multi-component structure.

Embodiments of the joint may include one or more of the following features. For example, the electrically-conductive adherent layer may be an epoxy, a conductive adhesive, or a solder, or a combination of these materials. The joint may be incorporated in an electrical device.

The multi-component structure may include a pair of opposing metal plates, a first outer O-ring positioned between the opposing metal plates, and a second outer O-ring positioned around the first outer O-ring and between the opposing metal plates. A first adhesive is disposed between the opposing metal plates in a space defined between an inner diameter of the second outer O-ring and an outer diameter of the first O-ring. A second adhesive is disposed between the opposing metal plates in a spaced defined by the inner diameter of the first O-ring. The first adhesive may be an electrically nonconductive adhesive and the second adhesive may be an electrically-conductive adhesive.

The multi-component structure may further include a pair of opposing metal plates and a nonconductive layer. Each metal plate may have at least one conductive projection projecting in the direction of the opposing metal plate and being conductively connected to the opposing conductive projection. The nonconductive layer may be positioned between the opposing metal plates and encapsulate the conductive projections. The conductive projections may be connected by a metal wire, or may be directly connected. The nonconductive layer may be, for example, a nonconductive adhesive, a nonconductive epoxy, or a nonconductive polymer composite, or a combination of these materials.

The electrically-conductive and mechanically-compliant joint between a pair of electrical components provides numerous advantages. For example, mechanical compliance may serve to attenuate the mechanical forces generated throughout the electrical components during operation. In this manner, the service duration of the device in which the electrical components are installed will be lengthened because the attenuated forces are less likely to harm the electrical components and joints. The use of nonconductive materials, along with conductive materials, in the joint, may reduce the overall cost of the joint. The electrical conductivity and mechanical compliance of the joint may be tailored by varying the ratio of the quantity of materials used in the joint.

Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
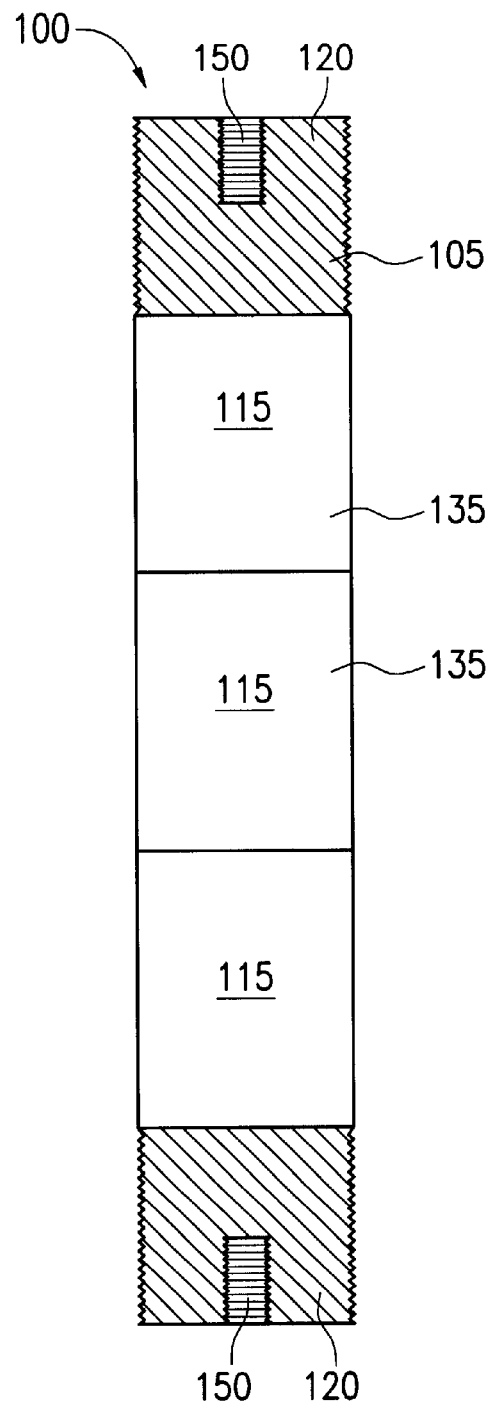
FIG. 1 is a cross-sectional view of an electrical component module showing joints between adjacent electrical components.
Figure 2:
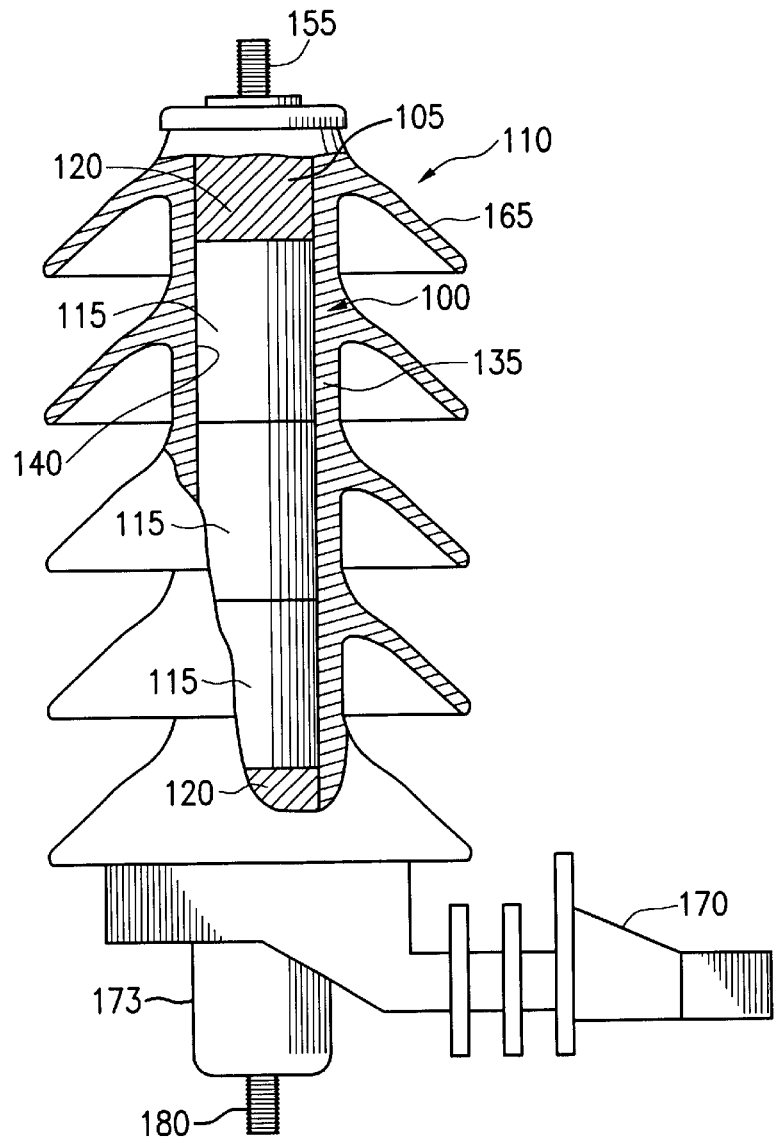
FIG. 2 is a partial cross-sectional view of an electrical component module in a surge arrestor.

Referring to FIGS. 1 and 2, an electrical component module 100 includes a bonded element stack 105 that serves as both the electrically-active component and the mechanical support component of a surge arrester 110. The stack 105 also exhibits high surge durability, in that it can withstand high current, short duration conditions, or other required impulse duties. For example, an implementation of the stack for use in heavy duty distribution arresters has proven capable of withstanding 100 kA pulses having durations of 4/10 microseconds, where 4/10 indicates that a pulse takes 4 microseconds to reach 90% of its peak value and 10 microseconds more to get back down to 50% of its peak value.

Elements of the bonded element stack 105 are stacked in an end-to-end relationship and bonded together at their end surfaces. Since the elements of the stack 105 are affirmatively bound together, the arrester 110 does not need to include a mechanism or structure for applying an axial load to the elements.

The surge arrester 110 may be implemented as a distribution class surge arrester. It should be understood, however, that the module 100 may be used in other types of surge arresters, and in other electrical protective equipment.

The bonded element stack 105 may include different numbers of elements, and elements of different sizes or types. Examples include varistors, capacitors, thyristors, thermistors, and resistors. For purposes of explanation, the stack is shown as including three metal oxide varistors ("MOVs") 115 and a pair of terminals 120.

Figure 3:
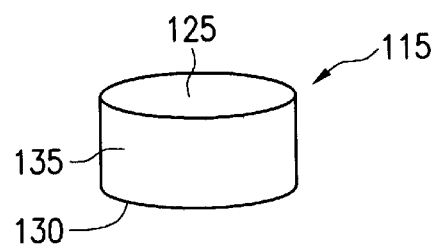
FIG. 3 is a perspective view of one varistor (MOV disk) of the electrical component module.

Referring also to FIG. 3, each MOV 115 is made of a metal oxide ceramic formed into a short cylindrical disk having an upper face 125, a lower face 130, and an outer cylindrical surface 135. The metal oxide ceramic used in the MOV 115 may be of the same material formulation used for any MOV disk.

The MOVs may be sized according to the desired application. For example, in one set of implementations, the MOV may have a diameter between approximately 1 to 3 inches, such that the upper and lower faces 125, 130 each have surface areas of between about 0.785 and 7.07 square inches.

Given a particular metal oxide formulation and a uniform or consistent microstructure throughout the MOV, the thickness of the MOV determines the operating voltage level of the MOV. In one implementation, each MOV is about 0.75 inches thick. In some implementations, this thickness may be tripled.

It is desirable to minimize the cross-sectional areas of the MOVs so as to minimize the size, weight and cost of the arrester. However, the durability and recoverability of the MOVs tend to be directly related to the sizes of the MOVs. In view of these competing considerations, MOVs having diameters of approximately 1.6 inches have been used.

The upper and lower faces 125, 130 may be metallized using, for example, sprayed-on coatings of molten aluminum or brass. In some implementations, these coatings have a thickness of approximately 0.002 to 0.010 inches. The outer cylindrical surface 135 is made up of the metal oxide formulation. In other implementations, the surface 135 may be covered by an insulative collar.

A terminal 120 is disposed at each end of the stack 105. Each terminal 120 is a relatively short, cylindrical block formed from a conductive material, such as, for example, aluminum. Each terminal 120 has a diameter substantially equal to that of an MOV 115. In some implementations, each terminal may also include a threaded bore 150 in which may be positioned a threaded conductive stud 155. In general, the terminals 120 may be thinner than terminals associated with modules that, for example, are wrapped with a structural layer to provide an axial load on the components of the module. This reduced thickness may result from changes in the geometry of the device, or simply because thicker metal is not needed for bonding with the structural layer.

As shown in FIG. 2, the surge arrester 110 includes the electrical component module 100, a polymeric housing 165, and an arrester hanger 170. The module 100 is disposed within the polymeric housing 165. An insulating or dielectric compound (not shown), such as room temperature vulcanized silicone, fills any voids between the module 100 and the inner surface 140 of the housing 165. A threaded conductive stud 155 is disposed in the bore 150 of each terminal 120. The upper stud 155 extends through the housing 165 and includes threads for engaging a terminal assembly (not shown). The lower stud 155 extends through an aperture (not shown) in hanger 170 for connection to a ground lead disconnector 175. A threaded stud 180 extends from the disconnector 175 to engage a ground lead terminal assembly (not shown). The housing 165 is sealed about the upper and lower ends of the module 100.

As noted above, elements of the bonded element stack 105 are bonded together at their end faces, such that the stack 105 serves as both the electrically-active component and the mechanical support structure of an electrical protective device, such as the surge arrester 110. The bonding provides a mechanically-compliant, electrically-conductive joint between the MOVs, which reduces the deleterious effects of the thermo-mechanical forces associated with service operating conditions and thus lengthens the expected service life of the surge arrester. The bonding may be implemented to form a mechanically-compliant joint using combinations of electrically-conductive materials and mechanically-compliant materials. In general, the joint reduces or dampens axial tensile forces by having a Young's modulus substantially below that of the disks it separates and bonds. In general, the necessary compliance of the joint is achieved by the joint having Young's modulus that is less than half that of the MOV disk's Young's modulus. More particularly, the Young's modulus of the joint may be between approximately one-eightieth and one-tenth of the Young's modulus of the electrical components the joint separates. Even more particularly, the Young's modulus of the joint may be approximately one-fortieth of the Young's modulus of the electrical components. For example, in one implementation, the disks have a Young's modulus of 16,000,000 pounds per square inch (psi), and the joint has a Young's modulus of approximately 400,000 psi. In most applications, the joint will have a thickness of approximately 0.25 inches. The bonding joint also may be implemented using a single material that is electrically-conductive and mechanically-compliant. The MOV disks optionally may be metallized with, for example, copper, aluminum, or brass. Examples of the electrically-conductive and mechanically-compliant joint are described below.

Figure 4:
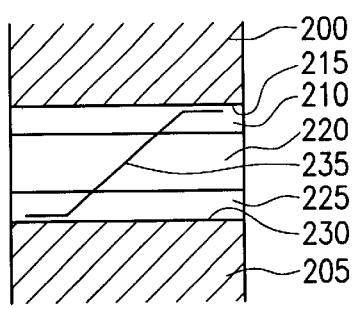
FIG. 4 is a cross-sectional view of a joint having a shunt between adjacent MOV disks.

Referring to FIG. 4, in one example, a first MOV disk 200 is bonded to a second MOV disk 205. A first layer 210 of a conductive adhesive bonds a lower face 215 of the first MOV disk 200 to a polymer composite layer 220. A second layer 225 of a conductive adhesive bonds the polymer composite layer 220 to an upper face 230 of the second MOV 205. A conductive shunt 235 is embedded in conductive adhesive layers 210 and 225, and passes through nonconductive polymer composite layer 220. Although conductive shunt 235 is not directly attached to the MOVs 200, 205, it can conduct electrical current between the MOVs because it is embedded in the conductive adhesive layers.

The conductive adhesive layers 210, 225 are made from a conductive adhesive, such as a silver epoxy adhesive. If the entire joint is approximately 0.25 inches thick, each adhesive layer is approximately 0.003 inches thick. The shunt 235 may be made from a conductive material, such as copper. The shunt may be formed, for example, from a ribbon of copper. The adhesive layers 210, 225 and the shunt 235 are mechanically-compliant and absorb the thermo-mechanical stresses that occur during an overvoltage condition. The polymer composite layer 220 may be made from a polymer or from a mixture of polymers. Although the joint between the MOV disks 200, 205 can be made entirely of a conductive adhesive, because of cost constraints, a nonconductive adhesive, or some other nonconductive material, typically is used to form part of the joint, because, in general, conductive materials having appropriate mechanical compliances tend to cost more than nonconductive materials. Therefore, in the example of FIG. 4, the adhesive and the shunt are made of conductive materials and the polymer layer is made of a nonconductive material.

The joint may be made, for example, by molding the polymer around the shunt 235, placing the adhesive on the faces 215, 230 of the MOV disks 200, 205, and then placing the molded polymer/shunt between the faces 215, 230 to bond the disks to the polymer/shunt.

Figure 5:
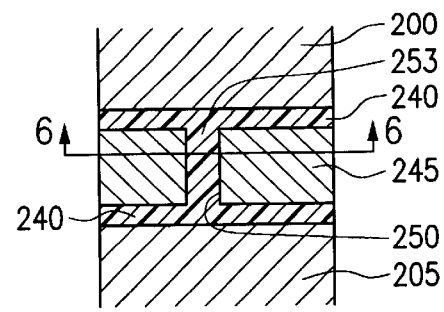
FIG. 5 is a cross-sectional view of a joint having a disk-shaped portion with a channel through its center.
Figure 6:
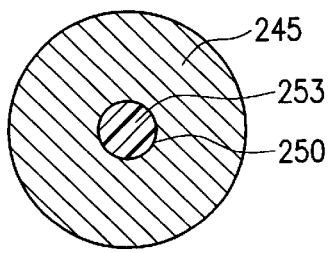
FIG. 6 is a cross-sectional view of the joint of FIG. 5 showing conductive adhesive in the channel of the disk-shaped portion taken along line 6—6 of FIG. 5.

Referring to FIG. 5, in a second example, the first MOV disk 200 is bonded to the second MOV disk 205 using conductive adhesive layers 240 and a polymer composite layer 245. The conductive adhesive layers 240 are bonded to the lower face 215 of the first MOV disk 200 and the upper face 230 of the second MOV disk 205. Referring also to FIG. 6, the polymer composite layer 245 may be configured, for example, to have an annular shape defining a central opening 250 through which a narrow conductive channel or shunt 253 made from the conductive adhesive extends to provide a conductive path between the conductive adhesive layers 240 and the disks 200, 205.

Figure 7:
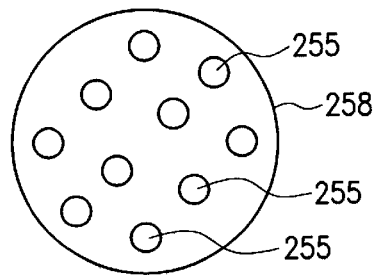
FIG. 7 is a top view of a disk-shaped portion of FIG. 5 in which the portion has multiple channels.

The polymer composite layer 245 is compliant and absorbs thermo-mechanical stresses that occur during an over-voltage condition. The conductive channel 253 and the conductive adhesive layers 240 conduct electrical current between the MOV disks 200, 205. The polymer composite layer 245 may be, for example, a polymer or a mixture of polymers that are fiber reinforced, or to which fillers have been added. The conductive adhesive 240 may be, for example, a silver epoxy adhesive. By varying the diameter of the central opening 250 to vary the cross-sectional area of the channel 253, the conductivity of the joint between the MOV disks 200, 205 can be controlled and tailored for a particular application. Although FIGS. 5 and 6 illustrate a single opening 250 in the polymer composite layer 245, with reference to FIG. 7, multiple openings 255 can be formed in a disk-shaped polymer composite layer 258 to vary the conductivity of the joint. The multiple openings 255 may provide better current distribution.

Figure 8:
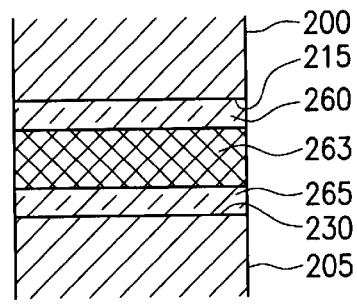
FIG. 8 is a cross-sectional view of a joint formed by a conductive adhesive and a foam metal.

Referring to FIG. 8, in a third example, the first MOV disk 200 is bonded to the second MOV disk 205 using a conductive adhesive and a foam metal. A first conductive adhesive layer 260 is bonded between the lower face 215 of the first MOV disk 200 and a foam metal layer 263. A second conductive adhesive layer 265 is bonded between an opposite side of the foam metal layer 263 and the upper face 230 of the second MOV disk 205. The conductive adhesive layers 260, 265 conduct electrical current between the MOV disks 200, 205 through the foam metal layer 263.

The foam metal layer 263 is compliant and absorbs thermo-mechanical stresses that occur during an over-voltage condition. In general, the foam metal layer is porous, and, for this application, may be fabricated to reduce the Young's modulus of the joint. The foam metal layer 263 also conducts electrical current between the conductive adhesive layers 260, 265. The porosity can be varied to vary the current density through the foam metal layer.

The foam metal layer 263 may be made of, for example, aluminum or other metals. The conductive adhesive layers 260, 265 may be made, for example, from a silver epoxy.

Figure 9:
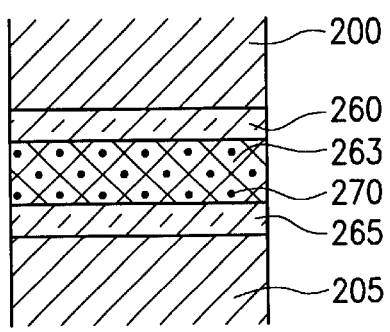
FIG. 9 is a cross-sectional view of the joint of FIG. 8 in which the foam metal is impregnated with an epoxy.

Referring to FIG. 9, in a fourth example, which is related to the example of FIG. 8, the foam metal layer 263 is impregnated with a nonconductive epoxy 270. The epoxy 270 fills in and eliminates the air space in the porous foam metal layer, which reduces or eliminates ionization that can occur in the air gaps of the porous layer. As in the example of FIG. 8, the porosity of the foam metal layer can be varied to vary the current density through the foam metal layer. Impregnating the foam metal layer with epoxy increases the Young's modulus of the joint. Other polymers can be used instead of the epoxy, with the polymers selected to have a low Young's modulus, if so desired.

Figure 10:
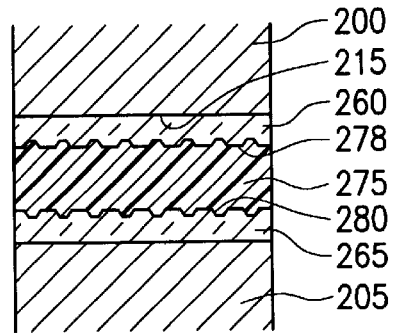
FIG. 10 is a cross-sectional view of a joint formed by a conductive adhesive and a deformable metal plate.

Referring to FIG. 10, in a fifth example, a metal plate 275 is positioned between conductive adhesive layers 260, 265. The metal plate 275 may be made, for example, from aluminum or copper. The plate 275 is formed to have a surface of peaks 278 and a surface of valleys 280. The peaks and valleys increase the plate's compliance by being deformable (i.e., crushable) to make the joint more compliant. The peaks 278 may be in contact with the faces 215, 230 of the MOV disks, or the conductive adhesive layers 260, 265 may separate the peaks 278 from the faces 215, 230.

Figure 11:
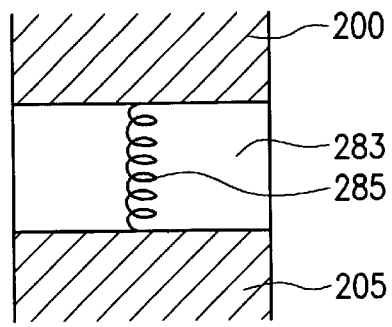
FIGS. 11 and 12 are cross-sectional views of a joint formed by a conductive adhesive in which one or more conductive springs are embedded.
Figure 12:
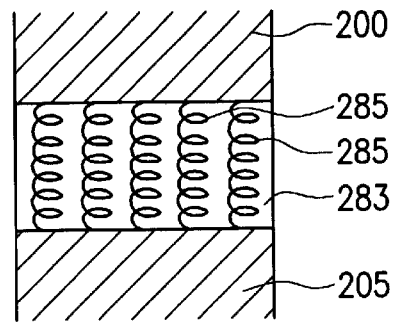

Referring to FIG. 11, in a sixth example, the first MOV disk 200 is bonded to the second MOV disk 205 using a conductive adhesive 283. A conductive spring 285 is embedded within the adhesive and electrically connects the MOV disks 200, 205. The conductive adhesive may be, for example, a silver epoxy. The cost of bonding the MOV disks increases with the amount of conductive adhesive used in the joint because conductive adhesives generally cost more than nonconductive adhesives. To reduce the cost of the joint, alternating regions or layers of conductive and nonconductive adhesive can be used, with the regions oriented parallel to the spring 285. The conductive spring 285 and the conductive adhesive 283 conduct electrical current and provide a compliant joint. The spring can be made of a material that is mechanically-compliant and electrically-conductive, such as a beryllium-copper alloy or a phosphorus-bronze alloy. Referring also to FIG. 12, multiple springs 285 can be used in place of the single spring 285 illustrated in FIG. 11.

Figure 13:
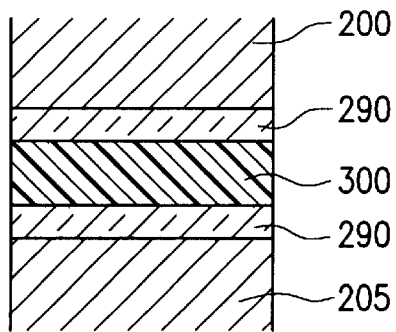
FIG. 13 is a cross-sectional view of a joint formed by a conductive adhesive and a polymer composite layer.

Referring to FIG. 13, in a seventh example, the first MOV disk 200 is bonded to the second MOV disk 205 using a pair of conductive adhesive layers 290, 295 and a polymer composite layer 300 in which a conductive material is added. The conductive material added to the polymer composite may be, for example, a silver or a carbon black constituent. The conductive adhesive layers 290, 295 may be made, for example, from a silver epoxy. The polymer composite layer 300 and the adhesive layers 290, 295 are compliant and absorb thermo-mechanical stresses that occur during an over-voltage condition. The polymer composite layer 300 conducts electrical current between the conductive adhesive layers 290, 295. The conductive adhesive layers 290, 295 conduct electrical current between the MOV disks 200, 205 through the polymer composite layer 300.

Figure 14:
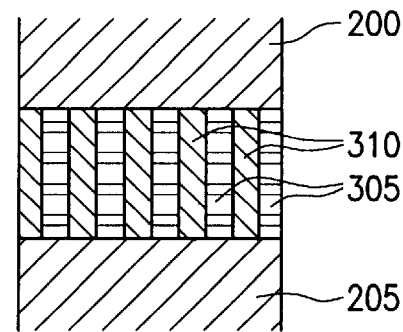
FIG. 14 is a cross-sectional view of a joint formed by alternating regions of a conductive adhesive and a nonconductive adhesive.

Referring to FIG. 14, in an eighth example, the first MOV disk 200 is bonded to the second MOV disk 205 using alternating regions or layers of a nonconductive adhesive 305 and a conductive adhesive 310. The ratio of the volume of nonconductive adhesive 305 to conductive adhesive 310 may be tailored to provide a specified conductivity between the MOV disks 200, 205. Because the non-conductive adhesive typically is stronger than the conductive adhesive, the ratio of the two can be varied to vary the strength of the bond. The nonconductive adhesive regions 305 and the conductive adhesive regions 310 provide a compliant interface. The conductive adhesive region 310 also provides an electrically-conductive path between the MOV disks 200, 205.

Figure 15:
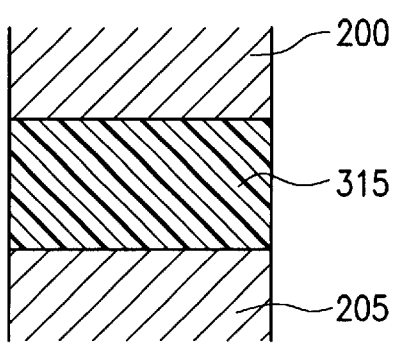
FIG. 15 is a cross-sectional view of a joint formed by a single component conductive and compliant layer.

Referring to FIG. 15, in a ninth example, the first MOV disk 200 is bonded to the second MOV disk 205 by a conductive layer 315. The conductive layer 315 may be a conductive adhesive, such as a silver epoxy, or a solder bond. If it is a solder bond, its thickness will be increased as compared to a typical solder bond so that it will provide the necessary compliance in the joint. Using either a conductive adhesive, a polymer or a solder to form the conductive layer 315 will provide a mechanically-compliant and electrically-conductive joint. To prevent the solder from melting due to the heat created during an over-voltage condition, the solder must have a melting point above the temperature that will be created during an over-voltage condition.

The thickness of the joint can be varied to control the compliance of the joint relative to the MOV disks. For example, a joint consisting of a single component, such as an adhesive or a solder, may be in a range of between approximately one-sixteenth to one-half of an inch thick. More particularly, the joint may be between approximately one-eighth to three-eighths of inch thick. Even more particularly, the joint may be approximately one-fourth of an inch thick.

The single component joint may be characterized by its Young's modulus relative to the Young's modulus of the disks or electrical components between which the joint is formed. For example, the Young's modulus of the joint may be less than approximately half that of the Young's modulus of the disks. More particularly, the Young's modulus of the joint may be approximately one-eightieth to one-tenth of the Young's modulus of the disks. Even more particularly, the joint may have a Young's modulus that is approximately one-fortieth of that of the Young's modulus of the disks.

Figure 16:
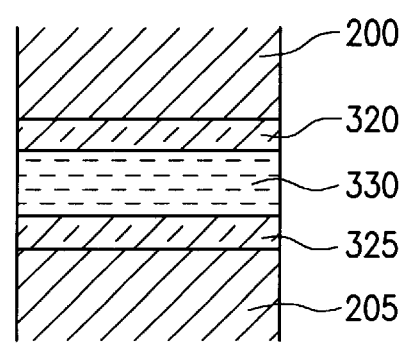
FIG. 16 is a cross-sectional view of a joint formed by a pair of conductive layers and a metal/polymer laminate layer.

Referring to FIG. 16, in a tenth example, the first MOV disk 200 is bonded to the second MOV disk 205 by a combination of a pair of conductive adhesive or solder bond layers 320, 325 between which a metal/polymer laminate layers 330 is positioned. The metal/polymer laminate layer 330 is electrically-conductive and provides the compliance necessary to reduce the thermo-mechanical stresses imparted during an over-voltage condition. The metal provides electrical conductivity and mechanical compliance, and the polymer provides mechanical compliance. The metal may be, for example, copper, aluminum, brass, or other metals.

Figure 17:
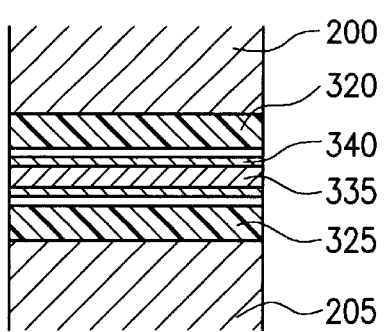
FIG. 17 is a cross-sectional view of a joint in which a polymer composite coated with a conductive coating is positioned between a pair of conductive layers.

Referring to FIG. 17, in an eleventh example, which is related to the example of FIG. 16, a polymer composite layer 335 is positioned between the conductive layers 320, 325. The polymer composite layer 355 is coated with a conductive coating 340 on all of its surfaces. The conductive coating 340 may be a paint, metallization, or other conductive coating material. In general, the coating 340 must conduct electrical current between conductive layers 320, 325 and must be a material to which solder will adhere. The conductive layer 320, 325 is mechanically-compliant and may be made of, for example, a conductive polymer, epoxy, or metal. The polymer composite also is mechanically-compliant and may be, for example, made from a compliant polymer.

Figure 18:
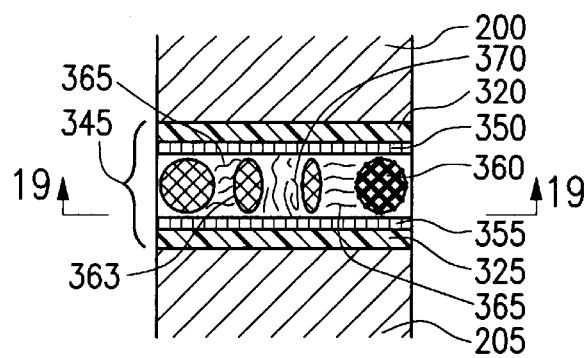
FIG. 18 is a cross-sectional view of a joint in which a metal plate and O-ring structure is positioned between a pair of conductive layers.
Figure 19:
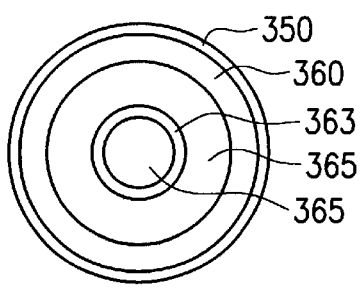
FIG. 19 is a top view of the metal plate and O-ring structure taken along line 19—19 of FIG. 18.

Referring to FIGS. 18 and 19, in a twelfth example, which is related to the examples of FIGS. 16 and 17, a compliant, electrically-conductive structure 345 is positioned between the conductive layers 320, 325. Structure 345 includes a pair of metal plates 350, 355 and a first outer O-ring 360 surrounding an inner O-ring 363, both of which are positioned between the metal plates. A nonconductive adhesive layer 365 and a conductive adhesive or solder layer 370 are placed between the metal plates 350, 355 and through the O-rings 360, 363, respectively. The conductive adhesive or solder layer 370 passing through the inner O-ring 363 is bonded to the metal plates 350 and 355 to form an electrically-conductive path between the plates and to provide compliance in the joint. The nonconductive adhesive layer 365 also provides compliance in the joint. The metal plates 350, 355 provide electrical conductivity in the joint and also can add compliance if, for example, they are flexible solid plates, crushable metal plates or foam metal plates. The O-rings 360, 363 provide compliance in the joint and may be made, for example, from epoxy. The epoxy may be electrically nonconductive or conductive if, for example, the epoxy is filled with silver or carbon black. The conductive layers may be an electrically-conductive and mechanically-compliant material, such as, for example, a conductive epoxy, a conductive adhesive, or solder.

In general, when the O-rings 360, 363 have circular cross-sections, they will have the same cross-sectional areas. O-rings with non-circular cross sections may have different cross-sectional areas. Besides adding compliance to the joint, the O-rings 360, 363 are used in the manufacturing of the joint to separate the nonconductive adhesive layer 365 and the conductive adhesive or solder layer 370. Thus, any shape of the O-rings can be used so long as they adequately separate the layers 365, 370 during manufacturing of the joint. For example, the outer O-ring 360 may have a round cross-section and the inner O-ring 360 may have an oval, square, triangular, rectangular, or other shaped cross-section if the inner O-ring adequately keeps the layers 365, 370 separated. In addition, each of the plates 350, 355 may have projections extending away from the plate in the direction of the opposite plate and the inner O-ring may have an outer diameter that fits between the projections. Such a configuration separates the layers 365, 370 during manufacture and maintains the usefulness of the compliance of the inner O-ring 365.

Figure 20:
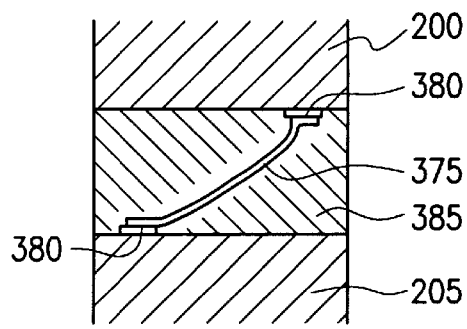
FIG. 20 is a cross-sectional view of a joint in which a conductive shunt is embedded in a nonconductive epoxy layer.

Referring to FIG. 20, in a thirteenth example, a conductive shunt 375 is connected to the MOV disks 200, 205 by a solder joint 380 adhered to each disk. The disks may be metallized to provide a better bond. The conductive shunt 375 is surrounded by a nonconductive polymer layer 385 that bonds the MOV disks together. The conductive shunt, which may be made of a conductive metal, such as copper, conducts an electrical current between the disks 200, 205. The polymer layer 385 provides compliance in the joint between the MOV disks 200, 205, which absorbs thermo-mechanical stresses associated with an over-voltage condition.

Figure 21:
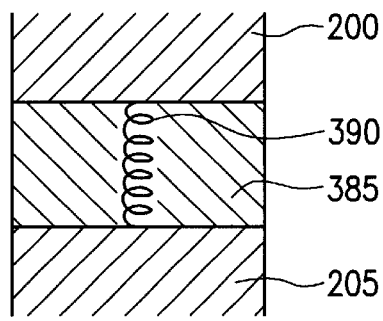
FIG. 21 is a cross-sectional view of a joint in which a conductive spring is embedded in a nonconductive epoxy layer.

Referring to FIG. 21, in a fourteenth example, which is related to the example of FIG. 20, the conductive shunt is replaced with a conductive spring 390. The spring 390 conducts an electrical current between the disks 200, 205. The spring may be made of an electrically-conductive and mechanically-compliant metal, such as a beryllium-copper alloy or a phosphorous-bronze alloy. The nonconductive polymer layer 385 provides mechanical compliance in the joint between the disks. The single spring 390 may be augmented by additional springs to vary the compliance and conductivity of the joint between the MOV disks 200, 205.

Figure 22:
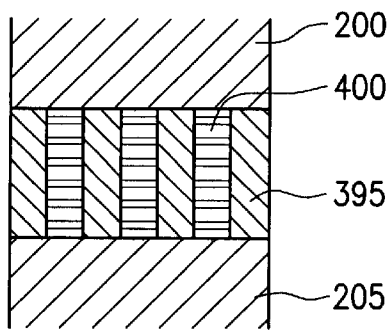
FIG. 22 is a cross-sectional view of a joint formed by alternating regions of a nonconductive epoxy and a metal foam.

Referring to FIG. 22, in a fifteenth example, metal foam regions or layers 395 and nonconductive polymer regions or layers 400 are positioned in an alternating arrangement between the MOV disks 200, 205. The metal foam regions, which may be made from, for example, aluminum, or other metals, conduct electrical current between the MOV disks 200, 205 and provide compliance to the joints. The metal foam regions can be impregnated with an epoxy or adhesive to eliminate air gaps, which reduces or eliminates ionization. The metal foam layers also can be soldered to the MOV disks. The polymer regions 400 provide compliance between the MOV disks and bond the MOV disks 200, 205 to each other.

Figure 23:
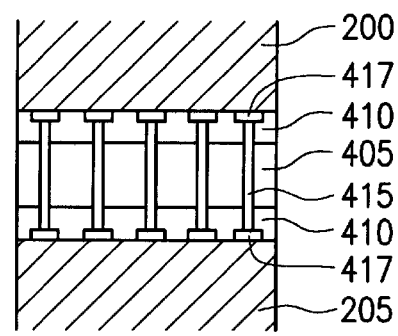
FIG. 23 is a cross-sectional view of a joint in which a pair of conductive adhesive layers surround conductive pins in a polymer composite layer.

Referring to FIG. 23, in a sixteenth example, a polymer composite layer 405 is bonded on opposite sides to a pair of adhesive layers 410, which are bonded to the MOV disks 200, 205. Metal pins 415 pass through the polymer composite layer 405 and terminate in the adhesive layers 410 against the MOV disks. The metal pins 415 have heads 417, which are soldered or adhered to the MOV disks 200, 205, and may conduct electrical current between the MOV disks 200, 205. The metal pins may be made of, for example, copper or other metals. The diameter of the pins may be varied to vary the conductivity between the MOV disks. The polymer composite layer 405 provides compliance in the joint between the MOV disks. The adhesive of the adhesive layers 410 may be a conductive adhesive or a nonconductive adhesive. The conductivity of the adhesive may be varied, for example, to tailor the electrical conductivity of the MOV disks 200, 205, and the device in which they are installed.

The arrangement between the polymer composite layer 405 and the metal pins 415 can be fabricated, for example, by placing the pins in a mold and injecting the polymer around them. The heads 417 then would be adhered to the MOV disks 200, 205, by soldering or through the use of an adhesive. Finally, the adhesive layers 410 would be placed between the polymer composite layer 405 and the MOV disks. The adhesive layers 410 also could be put onto the polymer composite layer 405 before the heads 417 are attached to the MOV disks.

Figure 24:
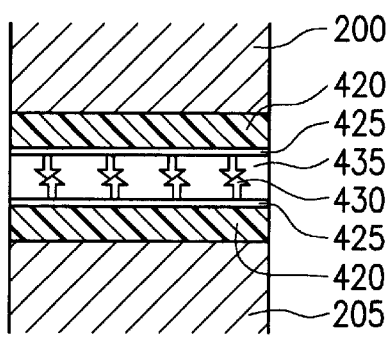
FIG. 24 is a cross-sectional view of a joint in which a pair of conductive adhesive layers surround a metal plate/polymer composite layer.

Referring to FIG. 24, in a seventeenth example, the MOV disks 200, 205 are bonded together by a pair of solder or conductive epoxy layers 420, a pair of metal plates 425 having fish hook anchors or projections 430, and a polymer composite layer 435. The solder or epoxy layers 420 are bonded on one side to the MOV disks 200, 205, and on the opposite side to the metal plates 425, thereby attaching the metal plates 425 to the disks. The fish hook anchors 430 extend from each metal plate 425 in the direction of the opposite metal plate such that they are embedded in the polymer composite layer 435, which firmly attaches the metal plates 425 to the polymer composite layer 435. The conductive epoxy may be, for example, a silver epoxy. The metal plates 425 and fish hook anchors 430 may be, for example, made from a conductive metal, such as copper. The polymer composite layer 435 may be made from a polymer or a mixture of polymers that has been fiber reinforced, or to which fillers have been added. The solder or conductive epoxy layers provide an electrically-conductive path between the metal plates 425 and the MOV disks 200, 205. An electrical current can pass between the fish hook anchors 430 of opposite metal plates 425 because the opposing fish hook anchors are directly connected, for example, by soldering, or indirectly connected, for example, by electrically-conductive wires attached to opposing anchors.

Figure 25:
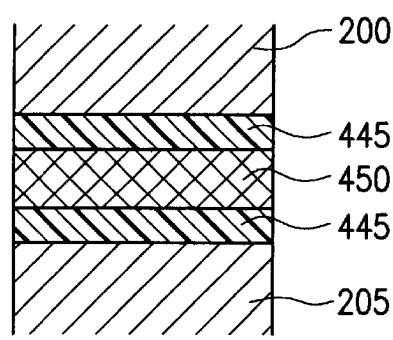
FIG. 25 is a cross-sectional view of a joint in which a pair of solder layers surround a deformable plate.

Referring to FIG. 25, in an eighteenth example, the MOV disks 200, 205 are bonded together by a pair of solder layers 445 with a deformable metal plate 450 positioned between the two solder layers 445. Each solder layer 445 is bonded on one side to one of the MOV disks 200, 205 and on its other side to one side of the deformable metal plate 450. Together, the solder layers and the deformable metal plate provide an electrically-conductive path between the MOV disks and a thermo-mechanically-compliant joint. The deformable metal plate may be made of an electrically-conductive metal, such as copper.

Figure 26:
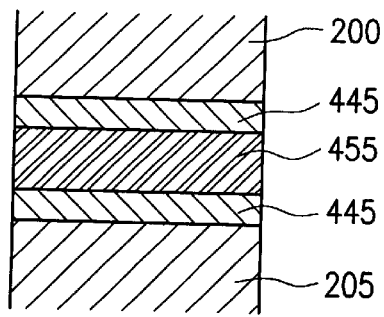
FIG. 26 is a cross-sectional view of a joint in which a pair of solder layers surround a foam metal plate.

Referring to FIG. 26, in a nineteenth example, which is related to the example of FIG. 25, the deformable metal plate 450 is replaced with a metal foam layer 455. Like the deformable metal plate 450, the metal foam layer 455 is electrically-conductive and provides a thermo-mechanically-compliant joint. The metal foam layer may be made of a conductive metal, such as copper. The porous structure of the metal foam layer may be impregnated with a polymer or an adhesive to prevent or reduce ionization.

Figure 27:
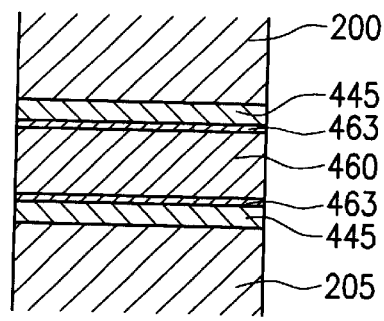
FIG. 27 is a cross-sectional view of a joint in which a pair of solder layers surround a polymer composite layer.

Referring to FIG. 27, in a twentieth example, which is related to the examples of FIGS. 25 and 26, the deformable metal plate and metal foam layers are replaced with a polymer composite layer 460. The layer 460 is filled with silver or carbon black and has a surface metallization layer 463 of a conductive material, such as brass, copper, or other metals. The metallization layer 463 improves the adherence between the solder layers 445 and the polymer composite layer 460. The solder layers and polymer composite layer provide a mechanically-compliant and electrically-conductive joint between the MOV disk 200, 205.

Figure 28:
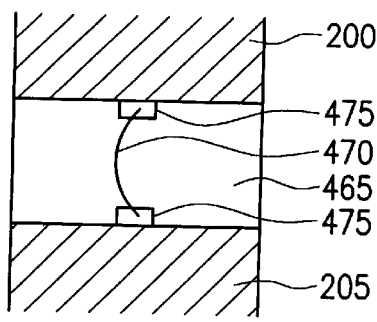
FIG. 28 is a cross-sectional view of a joint in which a wire is soldered to the MOV disks and is surrounded by an adhesive layer.
Figure 29:
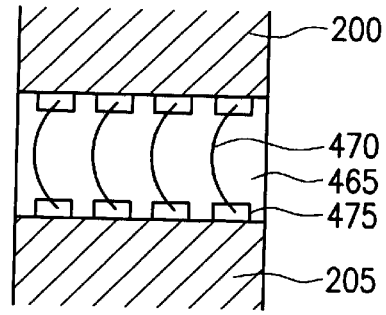
FIG. 29 is a cross-sectional view of a joint in which multiple wires are soldered to the MOV disks and surrounded by an adhesive layer.

Referring to FIGS. 28 and 29, in a twenty-first example, the MOV disks 200, 205 are bonded together by a nonconductive adhesive layer 465. As shown in FIG. 28, a wire 470 that is soldered at solder points 475 to both MOV disks provides an electrically-conductive path between the disks. The wire 470 is embedded in the adhesive layer 465, which provides a compliant joint. As shown in FIG. 29, multiple wires 470 also may be used to provide the electrically-conductive path.

In the above examples, the adhesive can be, for example, a polymer, such as a polyimide, polyamide, polyester, polyurethane, elastomer, silicone, or epoxy. The adhesive can be made electrically-conductive by adding a conductive material, such as silver, a silver alloy, and/or carbon black. The polymer and polymer composite laminates of the examples described above also can be one or more of the polymers listed above. The polymer composite laminates may be fiber reinforced, or formulated with fillers, such as reinforcing fillers to modify the mechanical properties of the laminate, or extending fillers to modify the physical properties of the laminate. The polymers and polymer composite laminates can be made electrically-conductive by adding conductive materials, such as silver, silver alloys, and/or carbon black.

In general, the joints described above will function between any pair of components in which a mechanically-compliant and electrically-conductive joint is necessary or desirable. For example, the joints described above can be formed between different electrical components, such as between an end terminal and a MOV disk. Other embodiments are within the scope of the following claims.

What is claimed is:

1. An electrically-conductive and mechanically-compliant joint between a pair of electrical components in a stack of electrical components that includes at least two varistors oriented such that a common axis passes through faces of the electrical components including faces of the varistors, the joint being positioned between a lower face of a first electrical component and an upper face of a second electrical component, having a Young's modulus that is less than approximately half of the Young's modulus of the electrical components, and being oriented such that the common axis passes through the joint.

2. The joint of claim 1, wherein the Young's modulus of the joint is approximately one-eightieth to one-tenth of the Young's modulus of the electrical components.

3. The joint of claim 1, wherein the Young's modulus of the joint is approximately one fortieth of the Young's modulus of the electrical components.

4. The joint of claim 1, wherein the Young's modulus of the joint is between approximately 200,000 psi and 1,600,000 psi and the Young's modulus of the electrical components are between approximately 13,000,000 psi and 18,000,000 psi.

5. The joint of claim 1, wherein the Young's modulus of the joint is between approximately 300,000 psi and 500,000 psi and the Young's modulus of the electrical components is between approximately 14,000,000 psi and 17,000,000 psi.

6. The joint of claim 1, wherein the Young's modulus of the joint is approximately 400,000 psi and the Young's modulus of the electrical components is approximately 15,000,000 psi.

7. The joint of claim 1, further comprising an electrically-conductive polymer that provides mechanical compliance.

8. The joint of claim 1, further comprising an electrically-conductive, mechanically-compliant metal alloy.

9. The joint of claim 1, wherein the joint is between approximately one-sixteenth of an inch to one-half of an inch thick.

10. The joint of claim 1, wherein the joint is between approximately one-eighth of an inch to three-eighths of an inch thick.

11. The joint of claim 1, wherein the joint is approximately one-fourth of an inch thick.

12. An electrical device including the joint of claim 1.

13. A method of making an electrically-conductive and mechanically-compliant joint between a pair of electrical components in a stack of electrical components that includes at least two varistors oriented such that a common axis passes through faces of the electrical components including faces of the varistors, the method comprising:

providing a first electrical component and a second electrical component; and forming the joint between the first electrical component and the second electrical component, the joint being positioned between a lower face of the first electrical component and an upper face of the second electrical component, having a Young's modulus that is less than half of a Young's modulus of the electrical components, and being oriented such that the common axis passes through the joint.

14. An electrically-conductive and mechanically-compliant joint between a pair of electrical components, the joint being positioned between a lower face of a first electrical component and an upper face of a second electrical component, and having a first layer of an electrically-conductive adhesive adhered to the lower face of the first electrical component and a second layer of the electrically-conductive adhesive adhered to the upper face of the second electrical component, and a polymer composite layer disposed between the electrically-conductive adhesive layers, wherein mechanical compliance of the joint is provided by the electrically-conductive adhesive layers and the polymer composite layer.

15. The joint of claim 14, further comprising a conductive shunt having a first end, a second end, and a middle section connecting the first end and the second end, wherein the first end is disposed in the first layer of electrically-conductive adhesive, the second end is disposed in the second layer of electrically-conductive adhesive, and the middle section passes through the polymer composite layer.

16. The joint of claim 14, wherein the polymer composite layer includes a first surface in contact with the first layer of adhesive and a second surface in contact with the second layer of adhesive, a first opening on the first surface, a second opening on the second surface, and a channel passing between the first and second openings, and the conductive adhesive of the first and second layers also is disposed in the channel to provide an electrically-conductive path between the first and second layers.

17. The joint of claim 16, wherein multiple channels pass between multiple first and second openings, and the conductive adhesive is disposed in the multiple channels to provide electrically-conductive paths between the first and second layers.

18. The joint of claim 14, wherein the polymer composite layer includes an electrically-conductive material.

19. The joint of claim 18, wherein the electrically-conductive material comprises a filler of silver alloy or carbon black.

20. The joint of claim 14, wherein the polymer composite layer comprises an electrically-conductive composite of metal and polymer.

21. The joint of claim 20, wherein the metal comprises copper, aluminum, or brass.

22. The joint of claim 21, wherein the polymer composite layer comprises a polymer layer having a metal coating on its surfaces.

23. The joint of claim 14, wherein the polymer composite layer further comprises electrically-conductive pins passing through the polymer layer and terminating in the adhesive layer.

24. The joint of claim 23, wherein opposite ends of the conductive pins are adhered to the upper face of the second electrical component and the lower face of the first electrical component.

25. An electrical device including the joint of claim 14.

26. An electrically-conductive and mechanically-compliant joint between a pair of electrical components, the joint being positioned between a lower face of a first electrical component and an upper face of a second electrical component comprising a first layer of an electrically-conductive adhesive adhered to the lower face of the first electrical component, a second layer of the electrically-conductive adhesive adhered to the upper face of the second electrical component and a metal layer disposed between the first layer and the second layer of electrically-conductive adhesive.

27. The joint of claim 26, wherein the metal layer comprises a foam metal plate.

28. The joint of claim 27, wherein the foam metal plate comprises aluminum.

29. The joint of claim 27, wherein the foam metal plate comprises a porous metal structure impregnated with a polymer or an adhesive.

30. The joint of claim 26, wherein the metal layer comprises a deformable metal plate having a first surface defining peaks and valleys and a second opposite facing surface defining peaks and valleys.

31. The joint of claim 30, wherein the deformable metal plate comprises aluminum or copper.

32. An electrical device including the joint of claim 26.

33. An electrically-conductive and mechanically-compliant joint between a pair of electrical components, the joint being positioned between a lower face of a first device and an upper face of a second device, and including regions of an electrically-conductive adhesive and alternating regions of an electrically-nonconductive adhesive.

34. An electrical device including the joint of claim 33.

35. An electrically-conductive and mechanically-compliant joint between a pair of electrical components, the joint being positioned between a lower face of a first electrical component and an upper face of a second electrical component, and comprising at least one electrically-conductive metal spring adhered on a first end to the upper face of the second electrical component and on a second end to the lower face of the first electrical component and a mechanically-compliant adhesive positioned between the upper face and the lower face.

36. The joint of claim 35, wherein the adhesive comprises an electrically-conductive adhesive.

37. The joint of claim 35, further comprising additional metal springs adhered on each first end to the upper face of the second electrical component and on each second end to the lower face of the first electrical component.

38. An electrical device including the joint of claim 35.

39. An electrically-conductive and mechanically-compliant joint between a pair of electrical components, the joint being positioned between a lower face of a first electrical component and an upper face of a second electrical component, and including an electrically-conductive shunt having a first end, a second end, and a middle section connecting the first and second ends, a first solder joint electrically connecting the first end to the lower face of the first electrical component, and a second solder joint electrically connecting the second end to the upper face of the second electrical component.

40. The joint of claim 39, further comprising a mechanically-compliant epoxy layer positioned between the lower face of the first electrical component and the upper face of the second electrical component and surrounding the electrically-conductive shunt.

41. The joint of claim 39, wherein the shunt comprises one or more springs.

42. An electrical device including the joint of claim 39.

43. An electrically-conductive and mechanically-compliant joint between a pair of electrical components, the joint being positioned between a lower face of a first electrical component and an upper face of a second electrical component, and including alternating regions of a metal and of an epoxy, the alternating regions being oriented perpendicularly to the upper face of the second electrical component and the lower face of the first electrical component.

44. The joint of claim 43, wherein the regions of metal comprise layers of a foam metal.

45. The joint of claim 44, wherein the regions of the foam metal comprise a porous structure impregnated with an epoxy or an adhesive.

46. An electrical apparatus including the joint of claim 43.

47. An electrically-conductive and mechanically-compliant joint between a pair of electrical components, the joint being positioned between a lower face of a first electrical component and an upper face of a second electrical component, and including at least one metal wire adhered on a first end to the upper face of the second electrical component and on a second end to the lower face of the first electrical component and an adhesive layer positioned between the upper face of the second electrical component and the lower face of the first electrical component.

48. The joint of claim 47, wherein the metal wire is adhered to the upper face and the lower face by solder.

49. The joint of claim 47, further comprising additional metal wires adhered on each first end to the upper face of the second electrical component and on each second end to the lower face or the first electrical component.

50. The joint of claim 47, wherein the metal wire comprises one or more springs.

51. An electrical device including the joint of claim 47.

52. An electrically-conductive and mechanically-compliant joint between a pair of electrical components, the joint being positioned between a lower face of a first component and an upper face of a second component, and including a first layer of solder adhered to the lower face the first electrical component, a second layer of solder adhered to the upper face of the second electrical component, and a metal layer between the first and the second layers of solder.

53. The joint of claim 52, wherein the metal layer comprises a deformable metal plate having a first surface defining peaks and valleys and a second opposite facing surface defining peaks and valleys.

54. The joint of claim 52, wherein the metal layer comprises a foam metal plate.

55. The joint of claim 54, wherein the foam metal plate comprises a porous structure impregnated with an epoxy or an adhesive.

56. The joint of claim 52, wherein the metal layer comprises a polymer composite layer having a surface metallization of a conductive material.

57. The joint of claim 56, wherein the polymer composite includes a silver alloy or a carbon black filler.

58. An electrical device including the joint of claim 52.

59. An electrically-conductive and mechanically-compliant joint between a pair of electrical components, the joint being positioned between a lower face of a first electrical component and an upper face of a second electrical component, and including an electrically-conductive adherent layer and a multicomponent structure.

60. The joint of claim 59, wherein the electrically-conductive adherent layer comprises an epoxy, a conductive adhesive or solder.

61. The joint of claim 59, wherein the multicomponent structure comprises:

a pair of opposing metal plates;

a first outer O-ring positioned between the opposing metal plates;

a second outer O-ring positioned around the second outer O-ring and between the opposing metal plates;

a first adhesive between the opposing metal plates in a space defined between an inner diameter of the second outer O-ring and an outer diameter of the first O-ring; and a second adhesive between the opposing metal plates in a spaced defined by the inner diameter of the first inner O-ring.

62. The joint of claim 61, wherein the first adhesive is an electrically nonconductive or conductive adhesive.

63. The joint of claim 59, the multi-component structure comprising:

a pair of opposing metal plates, each metal plate having at least one conductive projection projecting in the direction of the opposing metal plate and conductively connected to the opposing conductive projection; and a nonconductive layer positioned between the opposing metal plates and encapsulating the conductive projections.

64. The joint of claim 63, wherein the conductive projections are connected by a metal wire.

65. The joint of claim 63, wherein the conductive projections are directly connected.

66. The joint of claim 63, wherein the nonconductive layer comprises a nonconductive adhesive.

67. The joint of claim 63, wherein the nonconductive layer comprises a nonconductive epoxy.

68. The joint of claim 63, wherein the nonconductive layer comprises a nonconductive polymer composite.

69. An electrical device including the joint of claim 59.

* * * * *